US012680346B2

(12) United States Patent
Chang

(10) Patent No.: US 12,680,346 B2
(45) Date of Patent: Jul. 14, 2026

(54) ELECTROMAGNETIC LOCK SECURELY-MOUNTING STRUCTURE

(71) Applicant: GIANNI INDUSTRIES INC., New Taipei City (TW)

(72) Inventor: Che-Ming Chang, New Taipei City (TW)

(73) Assignee: GIANNI INDUSTRIES INC., New Taipei City (TW)

( * ) Notice: Subject to any disclaimer, the term of this patent is extended or adjusted under 35 U.S.C. 154(b) by 0 days.

(21) Appl. No.: 18/963,441

(22) Filed: Nov. 27, 2024

(65) Prior Publication Data

US 2026/0078609 A1 Mar. 19, 2026

(30) Foreign Application Priority Data

Sep. 16, 2024 (TW) ................................ 113210072

(51) Int. Cl.
*E05B 63/00* (2006.01)
*E05B 47/00* (2006.01)

(52) U.S. Cl.
CPC ...... *E05B 63/0052* (2013.01); *E05B 47/0002* (2013.01)

(58) Field of Classification Search
CPC ......................... E05B 63/0052; E05B 47/0002
See application file for complete search history.

(56) References Cited

U.S. PATENT DOCUMENTS

| | | | | |
|---|---|---|---|---|
| 5,376,910 | A * | 12/1994 | Geringer | E05C 19/166 335/278 |
| 5,758,913 | A * | 6/1998 | Roth | E05B 65/108 292/251.5 |
| 6,260,892 | B1 * | 7/2001 | Chang | E05C 19/166 292/341.16 |
| 6,609,738 | B1 * | 8/2003 | Roth | E05B 65/108 292/144 |
| 9,341,007 | B2 * | 5/2016 | Liao | E05C 19/166 |
| 11,377,888 | B2 * | 7/2022 | Shih | E05B 47/0002 |
| 11,566,442 | B2 * | 1/2023 | Corwin, Jr. | E05B 47/0002 |
| 2004/0195846 | A1 * | 10/2004 | Chang | E05C 19/168 292/340 |
| 2007/0262592 | A1 * | 11/2007 | Hwang | E05C 19/166 292/251.5 |
| 2010/0171322 | A1 * | 7/2010 | Chang | E05C 19/166 292/251.5 |

(Continued)

*Primary Examiner* — Mark A Williams
(74) *Attorney, Agent, or Firm* — Leong C. Lei

(57) ABSTRACT

An electromagnetic lock securely-mounting structure includes an electromagnetic lock having two end portions each of which is formed with a through hole is which a fastening member is arranged and a penetrating aperture in communication with the through hole; a plurality of secure mounting devices each having a first end that is formed with a protruded portion and a second end that is formed with a holed portion, a securing hole being formed in one side of each of the secure mounting devices, the plurality of secure mounting devices being received in the through holes with the protruded portions abutting against the fastening members; and a plurality of fixing members respectively penetrating through the penetrating apertures in the two end portions of the electromagnetic lock and screwed into the securing holes of the secure mounting devices.

3 Claims, 6 Drawing Sheets

(56) References Cited

U.S. PATENT DOCUMENTS

| | | | | |
|---|---|---|---|---|
| 2010/0218569 | A1* | 9/2010 | Hunt | E05B 65/108 70/276 |
| 2015/0308170 | A1* | 10/2015 | Chang | E05C 19/166 292/251.5 |

* cited by examiner

ELECTROMAGNETIC LOCK SECURELY-MOUNTING STRUCTURE

BACKGROUND OF THE INVENTION

(a) Technical Field of the Invention

The present invention relates generally to an electromagnetic lock, and more particularly to an electromagnetic lock securely-mounting structure.

(b) Description of the Prior Art

The electromagnetic lock is a commonly used electronic lock. The electromagnetic lock works based on the electromagnetic principle and can control the activation and deactivation of the lock body through electrical current without a mechanical key.

Taiwan Utility Model M358859 discloses an electromagnetic lock structure, which comprises a mounting plate. One end of the mounting plate is extended to form at least one protruded portion. One side of the mounting plate is formed with at least one recess and a raised wall. The electromagnetic lock includes a main body, and the main body of the electromagnetic lock is formed with at least one through hole. The through hole penetrates and is set in the protruded portion of the mounting plate. The main body of the electromagnetic lock is fixed on the mounting plate, and the mounting plate is fixed on one side of a door frame.

However, as shown in FIG. 1 of M358859, the electromagnetic lock, after being energized, generates a magnetic force that attracts and holds a metal plate of a door panel in such a way that the through hole of the main body of the electromagnetic lock is located at a lower side of the main body of the electromagnetic lock and is thus not shielded by the metal plate. Unscrupulous people may insert a tool (such as a screwdriver) into the through hole to easily remove the fastening member, so that it is not secure enough.

Further, in order to prevent the fastening member from falling off from the through hole, an additional through aperture is usually opened on one side of the through hole, and another screw is locked into the through aperture to contact against the side of the fastening member (which is also a screw). Thus, there are often problems that the screws and fastening members are not tightly engaged, easily resulting in the fixing parts becoming loosened and detaching.

SUMMARY OF THE INVENTION

To achieve the above objective, the present invention an electromagnetic lock securely-mounting structure, which comprises: an electromagnetic lock, the electromagnetic lock having two end portions each of which is formed with a through hole, a fastening member being arranged in the through hole, the two end portions of the electromagnetic lock being each formed with a penetrating aperture in communication with the through hole; a plurality of secure mounting devices, the plurality of secure mounting devices each having a first end and a second end, the first end being formed with a protruded portion, the second end being formed with a holed portion, a securing hole being formed in one side of each of the secure mounting devices, the plurality of secure mounting devices being respectively arranged in the through holes with the protruded portions contacting and abutting against the fastening members respectively; and a plurality of fixing members, the plurality of fixing members respectively penetrating through the penetrating apertures in the two end portions of the electromagnetic lock and screwed into the securing holes of the secure mounting devices.

In the above, the fastening member comprises a screw.

In the above, the securing hole comprises a threaded hole, and the fixing member comprises a screw.

With the protruded portions of the secure mounting devices contacting and abutting against the fastening member, unexpected situations of the fastening member getting loosened to make the electromagnetic lock falling down to become broken or to hurt people can be prevented. Further, with the secure mounting devices shielding and blocking the fastening members, easy removal by unscrupulous people operating a tool is achieved to thereby improve the effect of theft protection.

DETAILED DESCRIPTION OF THE PREFERRED EMBODIMENTS

Figure 1:
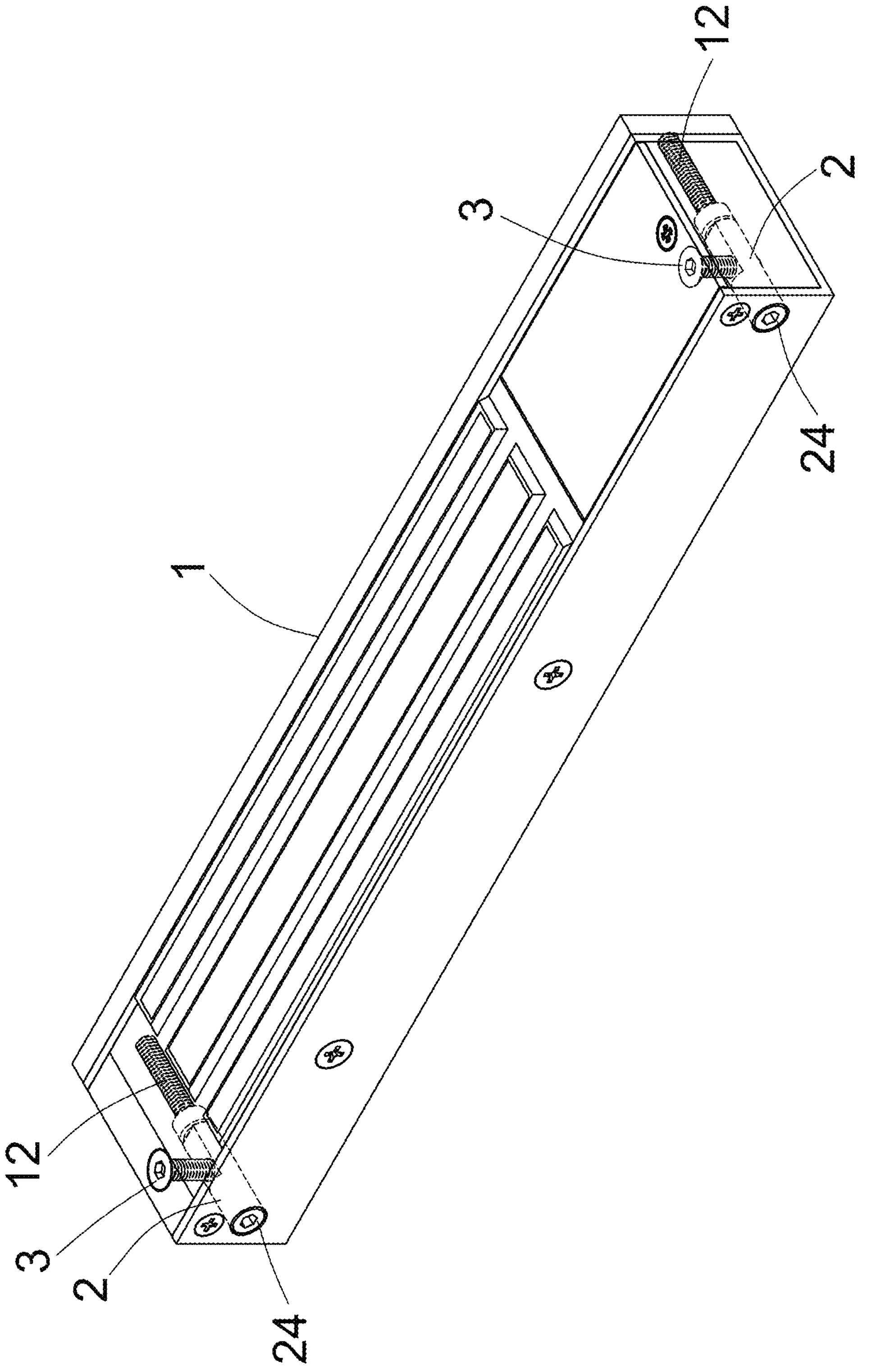
FIG. 1 is a perspective view showing an electromagnetic lock securely-mounting structure according to the present invention.
Figure 2:
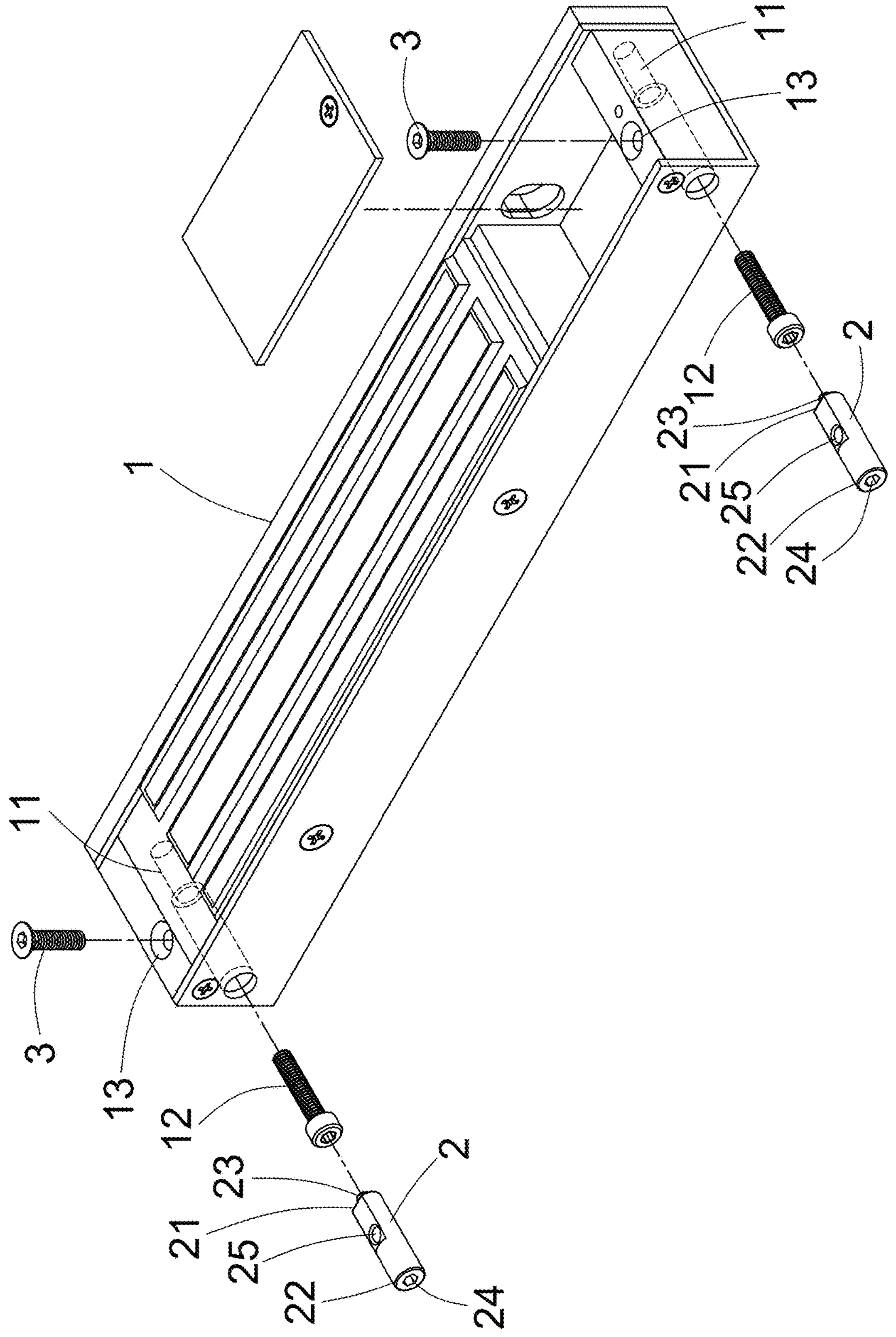
FIG. 2 is an exploded view showing the electromagnetic lock securely-mounting structure according to the present invention.

Referring to FIGS. 1 and 2, the present invention provides an electromagnetic lock securely-mounting structure, which comprises:

an electromagnetic lock 1, wherein the electromagnetic lock 1 is formed, in each of two end portions thereof, with a through hole 11, a fastening member 12 being arranged in the through hole 11, the two end portions of the electromagnetic lock 1 being each formed with a penetrating aperture 13 in communication with the through hole 11, wherein the electromagnetic lock 1, which is also referred to as a magnetic lock, which utilizes the principle electricity inducing magnetism such that when energized, the electromagnetic lock 1 will generate a strong attractive force to tightly attract and hold a metal plate 30 (shown in FIG. 6) to thereby achieve an effect of locking the door; and the fastening member 12 can be a screw, wherein the head of the screw is formed with a recess, which can be a linear slot, a cross slot, or a hex socket;

a plurality of secure mounting devices 2, wherein the plurality of secure mounting devices 2 each include a first end 21 and a second end 22, the first end 21 being formed with a protruded portion 23, the second end 22 being formed with a holed portion 24, a securing hole 25 being formed in one side of each of the secure mounting devices 2, the plurality of secure mounting devices 2 being respectively arranged in the through holes 11 with the protruded portions 23 contacting and abutting against the fastening members 12 respectively, wherein the protruded portions 23 of the secure mounting devices 2 respectively correspond to the recesses of the fastening members 12 (which are for example the screws discussed above) so that the secure mounting devices 2 tightly abut against the fastening members 12 for not easily detaching; and the holed portions 24 function to receive insertion of a tool (such as a magnetic screwdriver) for removing the secure mounting devices 2 from the through holes 11; and a plurality of fixing members 3, wherein the plurality of fixing members 3 respectively penetrate through the penetrating apertures 13 formed in the two end portions of the electromagnetic lock 1 to screw into or extend into the securing holes 25 of the secure mounting devices 2, respectively, wherein the securing holes 25 are each a threaded hole, and the fixing members 3 are each a screw.

Figure 3:
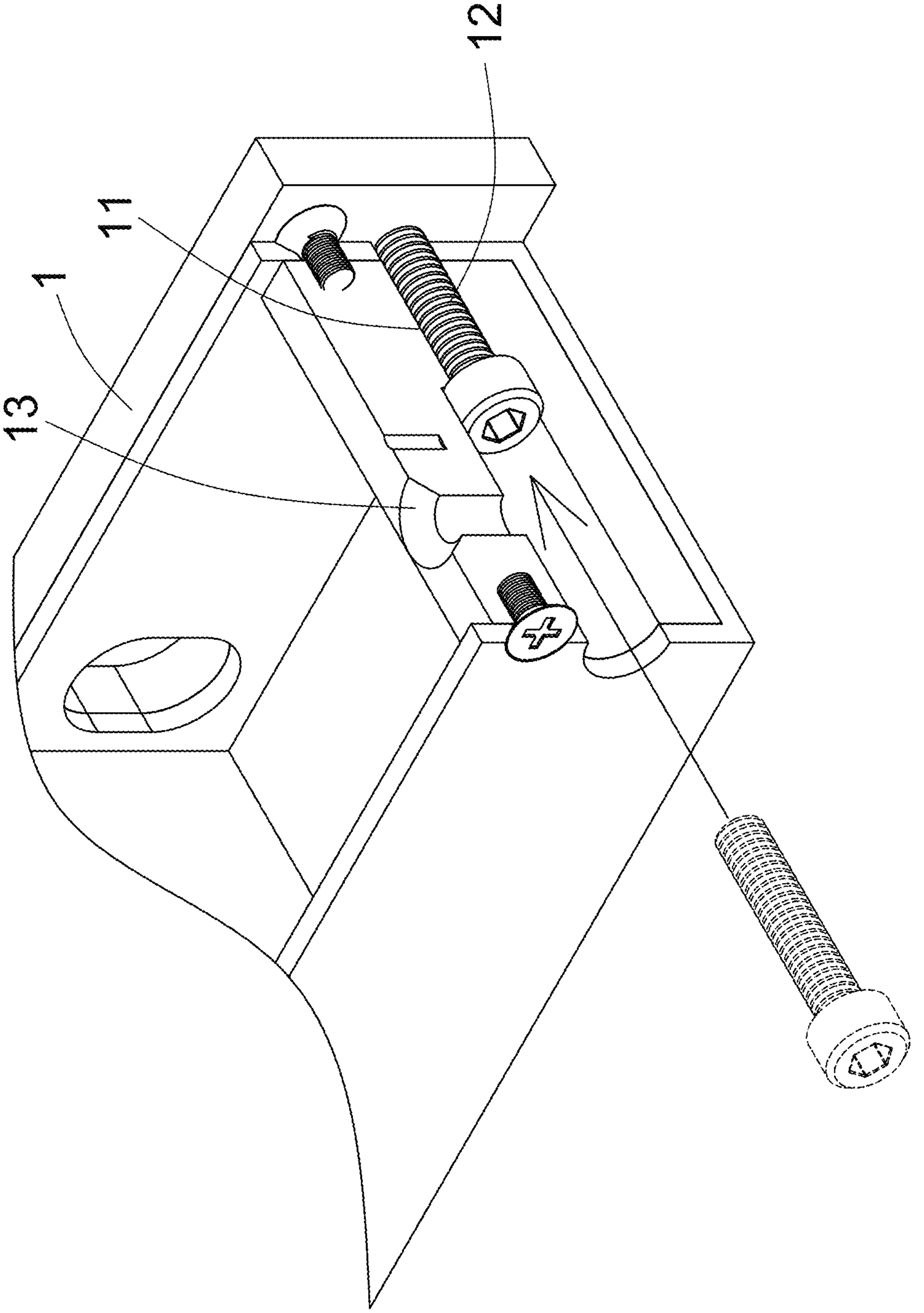
FIG. 3 is a first schematic view illustrating operation of the electromagnetic lock securely-mounting structure according to the present invention.
Figure 4:
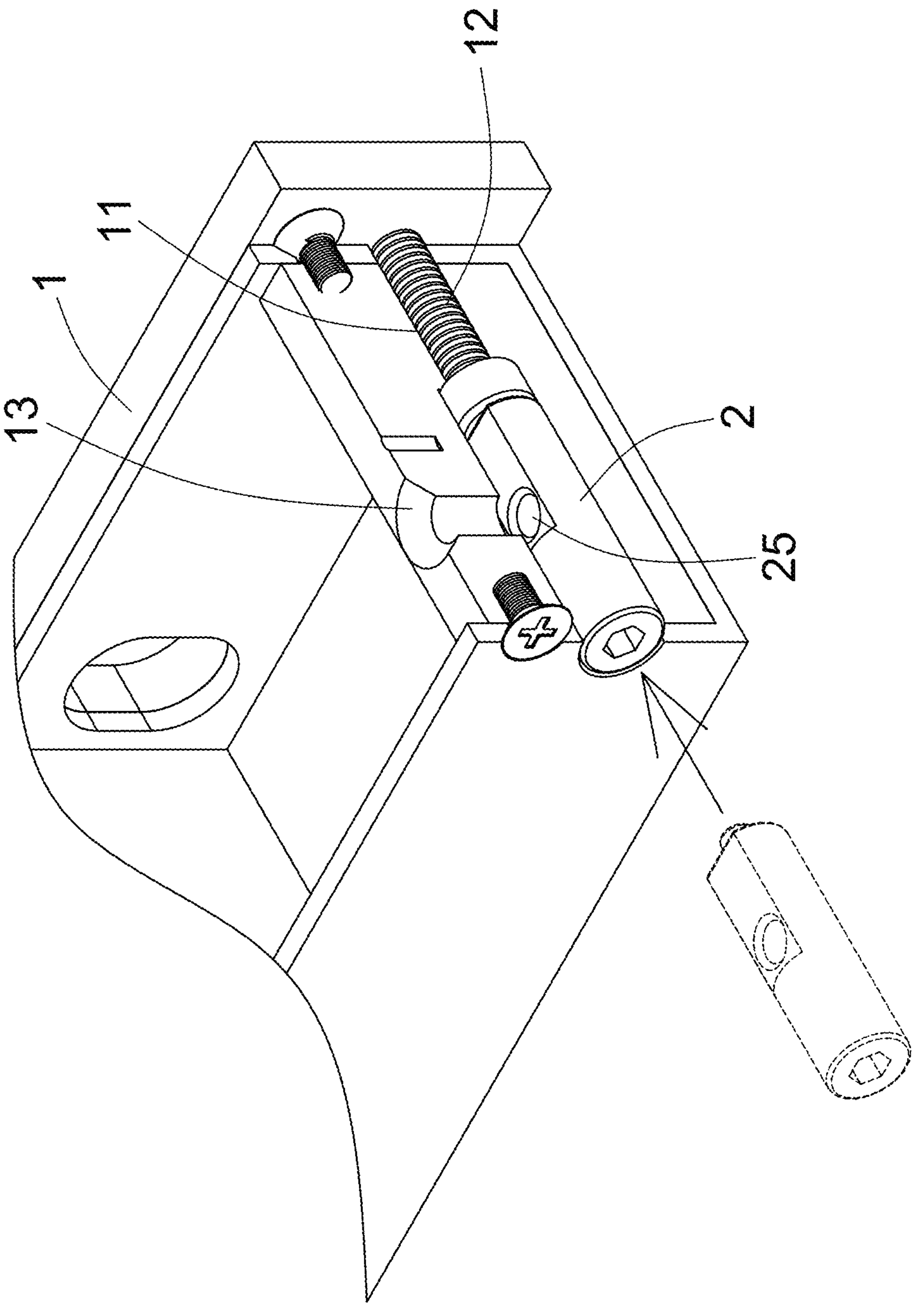
FIG. 4 is a second schematic view illustrating the operation of the electromagnetic lock securely-mounting structure according to the present invention.
Figure 5:
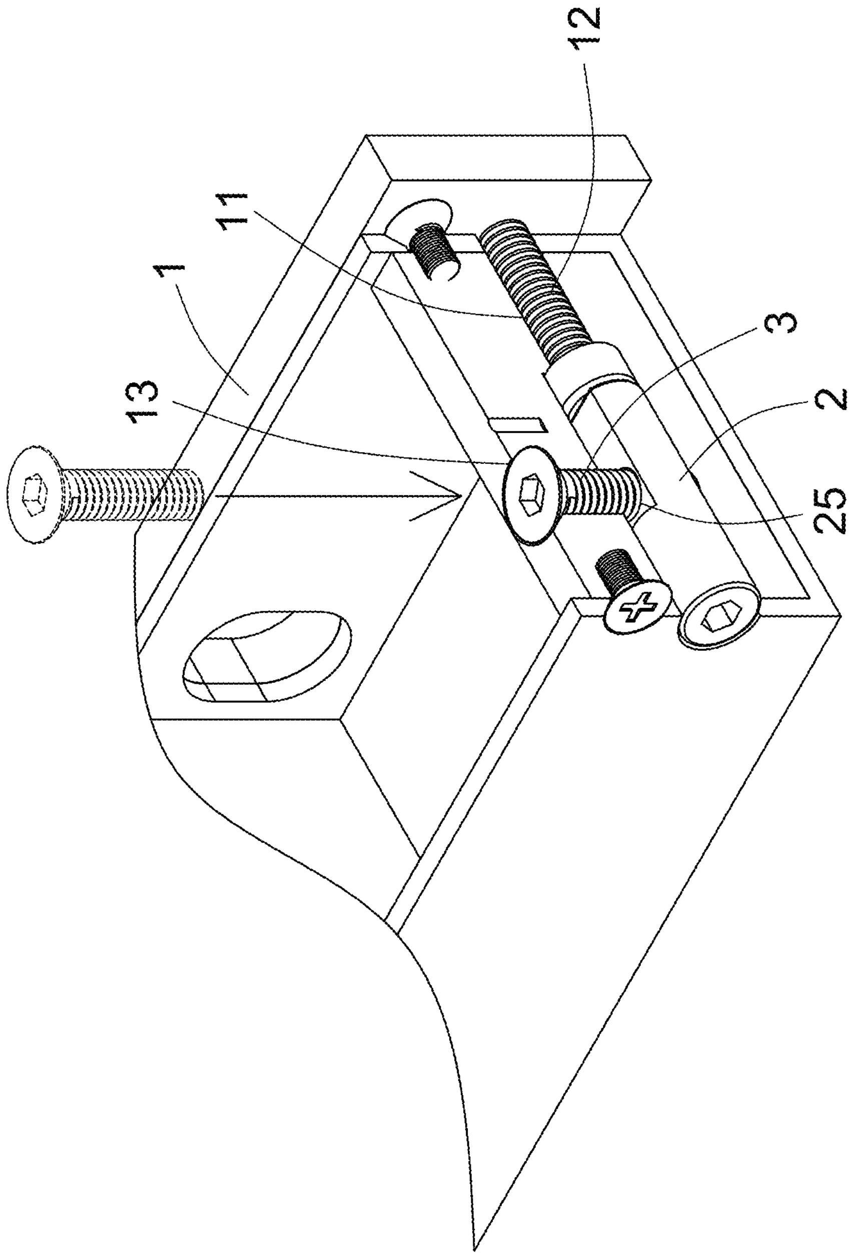
FIG. 5 is a third schematic view illustrating the operation of the electromagnetic lock securely-mounting structure according to the present invention.

Referring to FIG. 3, to use the present invention, a tool is first applied (such as inserting a screwdriver into the head of the screw) to screw the fastening members 12 into the through holes 11. Referring to FIG. 4, next, a tool (such as a magnetic screwdriver) is inserted into the holed portions 24 of the secure mounting devices 2 for placing the secure mounting devices 2 into the through holes 11 to have the protruded portions 23 of the secure mounting devices 2 corresponding to the recesses of the fastening members 12 (which are screws herein) to set the secure mounting devices 2 to tightly abut against the fastening members 12, so that after tightly abutting is achieved, the tool, as being hand held, is operated to rotate the secure mounting devices 2 to make the securing holes 25 on one side of the secure mounting devices 2 aligned with the penetrating apertures 13. Referring to FIG. 5, finally, a tool (such as a screwdriver) is used to have the fixing members 3 penetrating through the penetrating apertures 13 in the two end portions of the electromagnetic lock 1 to screw into the securing holes 25 of the secure mounting devices 2 to thereby fix the secure mounting devices 2.

Figure 6:
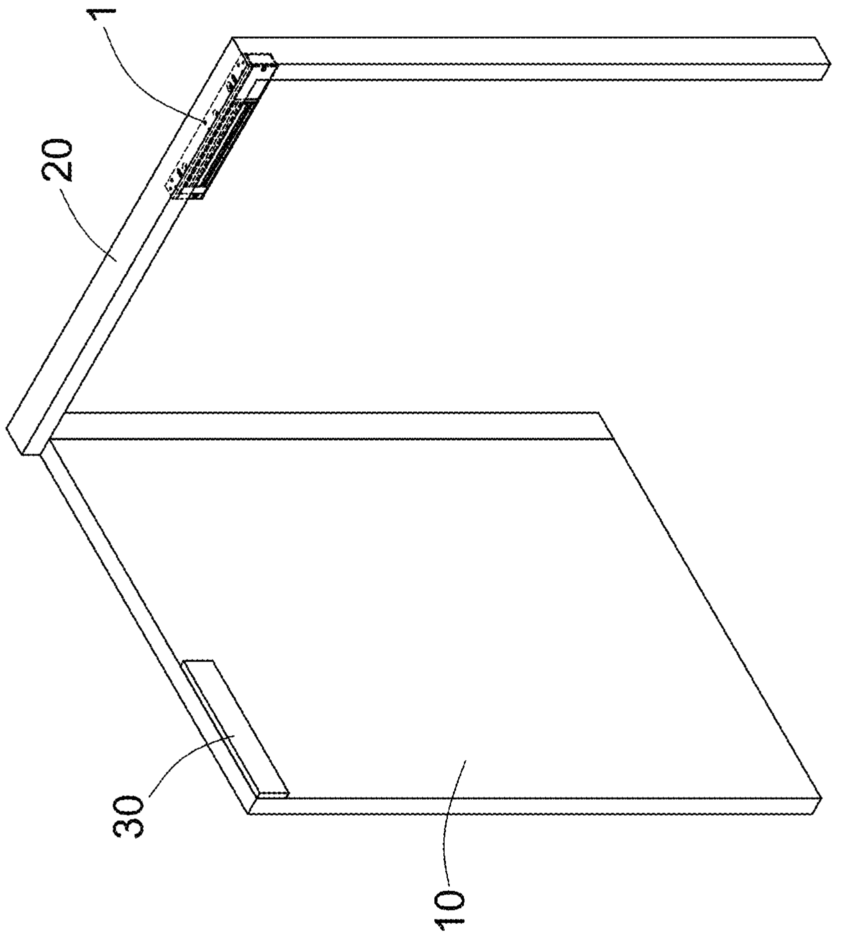
FIG. 6 is a schematic view showing an application of the electromagnetic lock securely-mounting structure according to the present invention.

Referring to FIGS. 2 and 6, in closing the door, the electromagnetic lock 1 on the door frame 20, when energized, generates a magnetic force that attracts and fixes the metal plate 30 of the door panel 10, and the securing holes 25 of the electromagnetic lock 1 are shielded and covered by the metal plate 30, such that only the through holes 11 are exposed. In case that the secure mounting devices 2 are not set up and installed, unscrupulous people may insert a tool (such as a screwdriver) into the through holes 11 to easily remove the fastening members 12; however, oppositely, if the secure mounting devices 2 are set up and installed as described above, the secure mounting devices 2 may shield and block the fastening members 12, and as the secure mounting devices 2 are fixed in position by the fixing members 3 and the securing holes 25 are shielded and covered by the metal plate 30, the unscrupulous people cannot remove the fastening members 12 by simply using the tool, and as such, an effect of theft protection is improved.

With the protruded portions 23 of the secure mounting devices 2 abuts against the fastening members 12, unexpected situations of the fastening member 12 getting loosened to make the electromagnetic lock 1 falling down to become broken or to hurt people can be prevented. Further, with the secure mounting devices 2 shielding and blocking the fastening members 12, easy removal by unscrupulous people operating a tool is achieved to thereby improve the effect of theft protection.

I claim:

1. An electromagnetic lock securely-mounting structure, the electromagnetic lock comprising:

two end portions each of which is formed with a respective through hole, a fastening member being arranged in the respective through hole, the two end portions of the electromagnetic lock being each formed with a penetrating aperture in communication with the respective through hole, wherein the electromagnetic lock, when energized, generates a magnetic attractive force to lock a door;

a plurality of secure mounting devices, the plurality of secure mounting devices each having a first end and a second end, the first end being formed with a protruded portion, the second end being formed with a holed portion, a securing hole being formed in one side of each of the secure mounting devices, the plurality of secure mounting devices being respectively arranged in the through hole with the protruded portions contacting and abutting against the respective fastening members so as to shield and block the fastening members from unauthorized removal; and a plurality of fixing members, the plurality of fixing members respectively penetrating through the penetrating apertures in the two end portions of the electromagnetic lock and screwed into the securing holes of the secure mounting devices to fix the secure mounting devices in position.

2. The electromagnetic lock securely-mounting structure according to claim 1, wherein the fastening member comprises a screw.

3. The electromagnetic lock securely-mounting structure according to claim 1, wherein the securing hole comprises a threaded hole, and the fixing members comprise screws.

* * * * *